US005154438A

United States Patent [19]

Barclay

[11] Patent Number: 5,154,438

[45] Date of Patent: Oct. 13, 1992

[54] TILTING AND FOLDING WHEELCHAIR

[76] Inventor: Hugh W. Barclay, 241 Glengarry Road, Kingston, Ontario K7M 3J6, Canada

[21] Appl. No.: 767,646

[22] Filed: Sep. 30, 1991

[51] Int. Cl.[5] .................... B62B 1/04

[52] U.S. Cl. .................... 280/250.1; 280/42; 280/649; 280/650; 280/657; 297/19; 297/DIG. 4

[58] Field of Search .................... 280/250.1, 42, 649, 280/650, 657; 297/DIG. 4, 19, 21

[56] References Cited

U.S. PATENT DOCUMENTS

| | | | |
|---|---|---|---|
| 2,460,459 | 2/1949 | Kraska | 297/DIG. 4 |
| 3,198,575 | 8/1965 | Hawkins | 297/DIG. 4 |
| 4,813,693 | 3/1989 | Lockard et al. | 280/42 |
| 4,861,056 | 8/1989 | Duffy, Jr. et al. | 297/DIG. 4 |
| 4,966,379 | 10/1990 | Mulholland | 280/250.1 |

FOREIGN PATENT DOCUMENTS

| | | | |
|---|---|---|---|
| 1122984 | 8/1968 | United Kingdom | 280/650 |

*Primary Examiner*—Eric D. Culbreth
*Attorney, Agent, or Firm*—Richard J. Hicks

[57] ABSTRACT

A tilting and laterally folding wheelchair design is described in which a tilting mechanism incorporating a pivoting action at both the front and back of the chair is provided so that as the chair is tilted the center of gravity of the occupant is maintained relative to the wheelbase. A lateral folding device, which incorporates X-cross members free at their upper ends, is stabilized by link members which are pivotally mounted at their outer ends, so as to provide room for the chair to be folded laterally.

5 Claims, 2 Drawing Sheets

TILTING AND FOLDING WHEELCHAIR

FIELD OF THE INVENTION

This invention relates to a wheelchair in which the seat is tiltable between an upright and sloping rearwardly position and the chair is laterally foldable for easy transportation.

BACKGROUND OF INVENTION

Laterally folding wheelchairs have been in use for over fifty years and many models are still on the market. There are two general systems to accomplish lateral, as opposed to longitudinal, folding. In the sliding tube system, cross members in an X-configuration are articulated, at the lower ends, to the lower side frame rails and, at the upper ends, to the seat rail. The cross members include a telescopically sliding tube so that on folding the side frames are held in alignment with the seat rails. When the seat rails are raised, the system collapses and the seat rails rise relative to the side frame.

Most contemporary wheelchairs, however, incorporate a link system to conserve weight and provide a more stable frame system than is possible with the sliding tube system. The X-frames are essentially the same in that they are articulated to the side rails and seat rails. However, when the chair is in the open position the seat rail rests in a saddle which is attached to the side frame. A link which articulates with the upper side member rail and the cross member is used to maintain alignment during folding. The link system is folded and unfolded in the same manner as the sliding tube system and the seat rail rises relative to the side frame when folded. Unfortunately neither of these two lateral folding systems can be used with a chair which incorporates a tilt function. Wheelchairs which incorporate a tilt function have heretofore always been of the longitudinal folding type which are not as convenient or as compact and hence not favored in the market. As used herein the term tilt means the function which allows the seat and back of the chair to change angle as a unit relative to the horizontal, in contrast to a reclining chair in which the back angle is changed relative to the position of the seat.

OBJECT OF INVENTION

Thus, it is an object of the present invention to provide a wheelchair which may be laterally folded and which incorporates a tilt function.

BRIEF STATEMENT OF INVENTION

By one aspect of this invention there is provided a laterally folding and tiltable wheelchair assembly comprising:

A pair of side frame members arranged in spaced parallel overlying relationship;

a pair of side seat frame members in spaced parallel relationship, each pivotally mounted at a respective forward end thereof to one end of a first link member which is pivotally mounted to a said side frame member at the other end thereof; each of said side seat frame members being telescopically mounted to a respective said side frame member at a respective rearward end thereof, such that as said link members are rotated relative to said side frame members, the center of gravity of a person seated in said wheelchair is maintained fore and aft relative to said side frames;

a pair to pivotally inter-connected cross members pivotally mounted at the lower ends thereof to respective lower said side frames; and a pair of second link members each pivotally mounted at one end thereof to an upper respective said side frame member and pivotally connected at the other end thereof to a respective cross frame member intermediate said pivotal inter-connection thereof and a free upper end of said cross frame member.

DETAILED DESCRIPTION OF THE PREFERRED EMBODIMENTS

Figure 1:
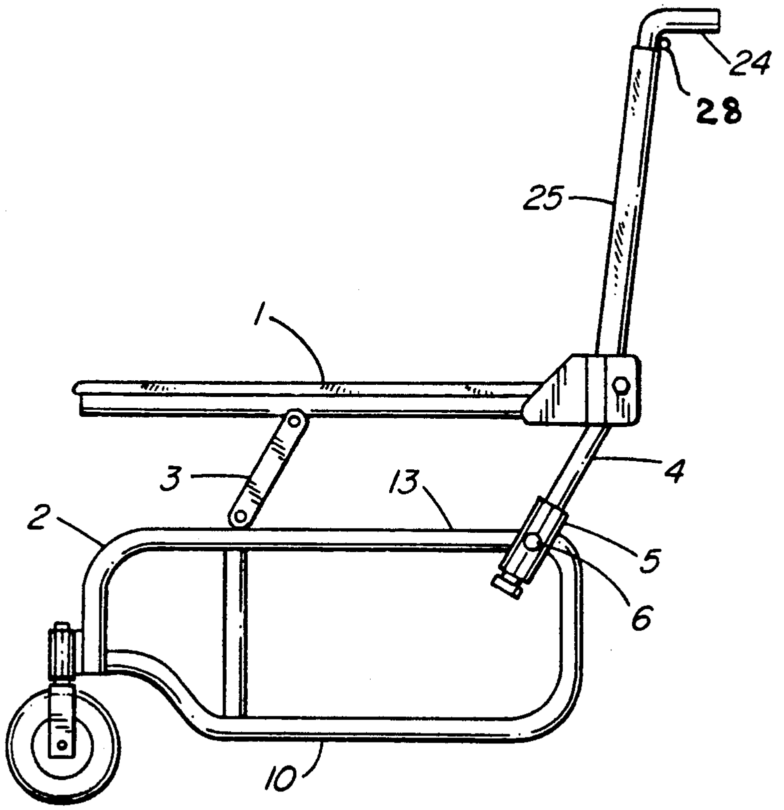
FIG. 1 is a side view of the tilt mechanism in the upright position.
Figure 2:
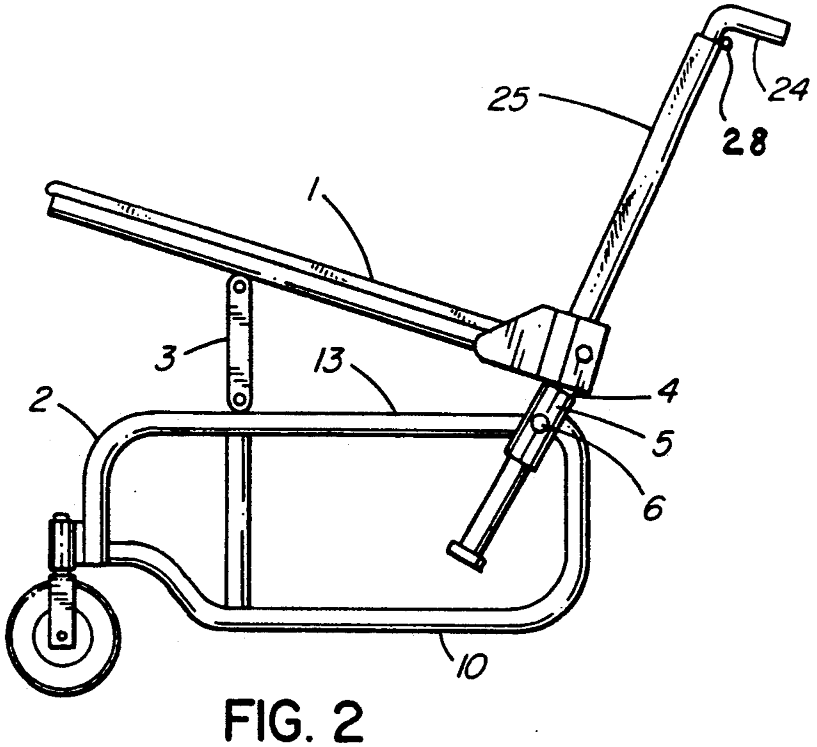
FIG. 2 is a side view of the tilt mechanism in the tilted position.

With reference to FIGS. 1 and 2 seat rails 1 of a wheelchair (the rear wheels of which have been removed for clarity) according to this invention are articulated to the side frames 2 by means of anterior link members 3 and posterior posts 4 which slide in tubes 5 which are rigidly mounted at a selected angle on side frames 2. A locking device 6, such as a clamping screw is provided in each of tubes 5 so as to lock the posterior posts at any desired positions within the range of movement of the tilt mechanism. It will be appreciated that as the chair seat is tilted the seat rails move forward (as seen in FIG. 2) thereby substantially eliminating the usual rearward displacement of the center of gravity that normally occurs with a single pivot tilting mechanism. Rearward displacement of the center of gravity is undesirable as it induces instability which is a safety hazard which generally requires lengthening the wheel base of the chair, with the attendant disadvantages of increased rolling resistance and turning inertia.

Figure 3:
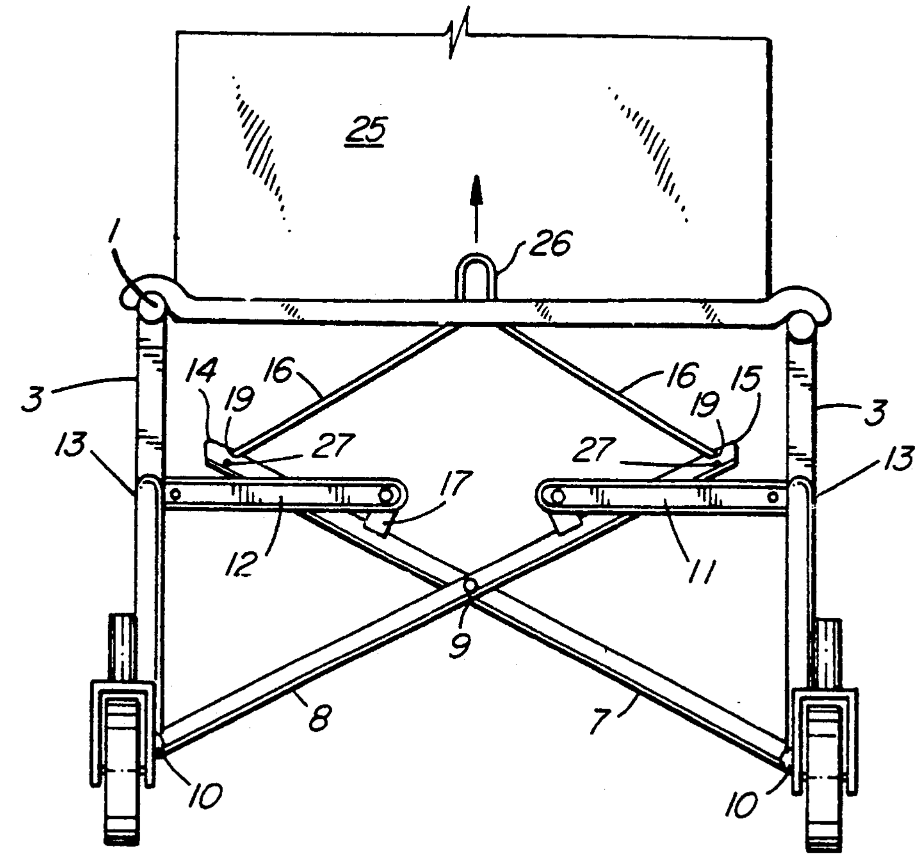
FIG. 3 is a front view of a wheelchair showing the folding mechanism in an intermediate position between open and closed.

Turning now to the lateral folding mechanism which is illustrated in FIG. 3, cross members 7,8 are pivotally mounted at their lower ends to their respective lower side frames 10. A pair of link guide members 11,12 are pivotally mounted at one end thereof to a respective upper side frame member 13, and at the other end thereof to said cross members 7,8 intermediate their centers 9 and the free ends 14,15 thereof. A cable 16 is attached to the ends 14,15 to facilitate folding as described in more detail hereinafter.

Figure 4:
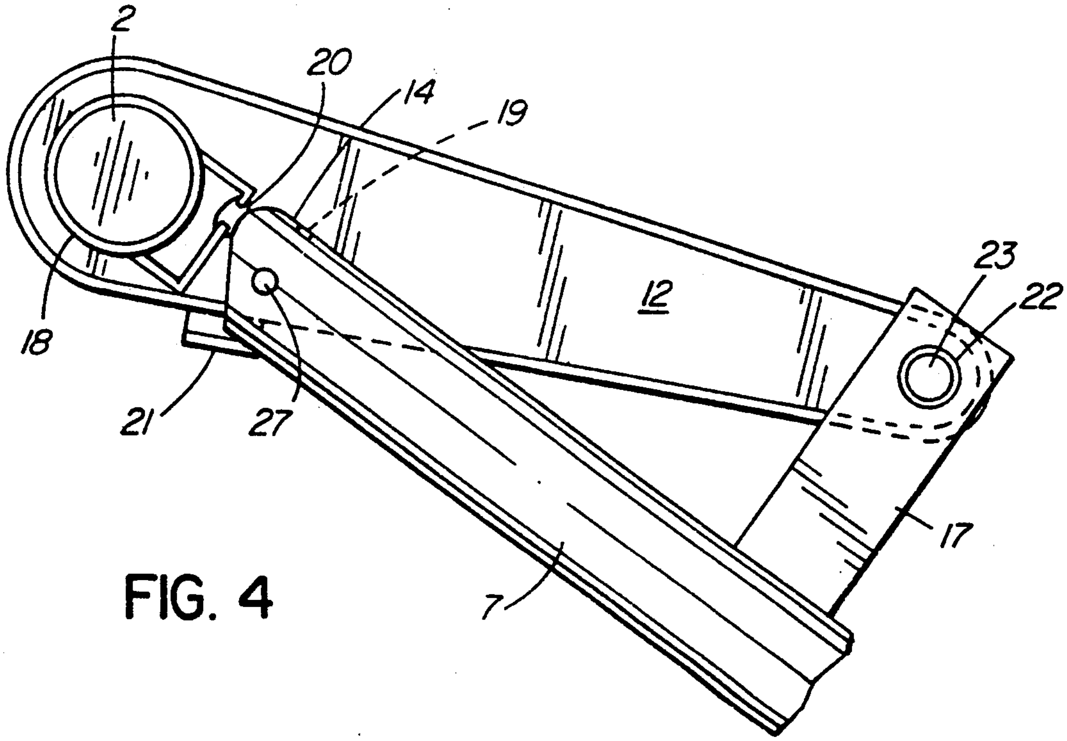
FIG. 4 is a enlarged view of part of FIG. 3 showing the attachment of the cross member and link member.

Turning now to FIG. 4 which is an enlarged view of part of the folding mechanism of FIG. 3, shown in the fully open position, it can be seen that cross member 7 is provided with an inner pivot 17 to mount it to link member 12, and link member 12, provided with an outer pivot 18 to pivotally mount it to upper side rail 2. The upper end 14 of member 7 is provided with a hole 19 to receive cable 16, and a rubber or other elastomeric bumper 20 is provided between end 14 and side member 2. A stop 21 is provided on link 12 to prevent cross member 7 from passing by the bumper 20 when the chair is fully open. It will be noted that it is preferred to provide some clearance 22 at the inner pivot point 23 of link member 12, so as to allow natural compression forces to pass from the side frame, via rubber bumper 20 into cross member 7. The rubber bumper 20 at the end 14 of member 7 provides some additional flexibility and ensures that the chair will not begin to fold under minor lateral forces when the chair is in use. A detent lock may also be inserted in hole 27 to provide additional assurance that the chair cannot accidentally fold in use. A folding strut (28) may be provided between back rest members 25 and adjacent handles 24 so as to prevent inward movement of the seat rails due to the weight of the patient or loads imposed during a crash or the like.

In order to fold the chair, the strut 28 between members 25 is first removed and folding is initiated by pulling upwardly on loop 26 connecting cords 16. This causes the upper ends 14 and 15 of members 7 to move inwardly and link members 11, 12 to pivot upwardly about pivot 18. Folding is then completed by leaning the chair on its side to raise one wheel off the ground and then gently pushing the two large wheels and sides together. To open the chair the reverse action is applied, care being taken to ensure that the link members 11, 12 snap over center from the position shown in FIG. 3 to the position shown in FIG. 4 and the detents are engaged.

It will be appreciated that many modifications to the present invention may suggest themselves to those skilled in the art without departing from the scope of this invention as defined in the appended claims.

I claim:

1. A laterally folding and tiltable wheelchair assembly comprising:

(a) a pair of side frame members each having a lower portion and arranged in spaced parallel overlying relationship;

(b) a pair of side seat frame members in spaced parallel relationship, each pivotally mounted at a respective forward end thereof to one end of a first link member which is pivotally mounted to a said side frame member at the other end thereof; each of said side seat frame members being telescopically mounted to a respective said side frame member at a respective rearward end thereof, such that as said link members are rotated relative to said side frame members, the center of gravity of a person seated in said wheelchair is maintained fore and aft relative to said side frames;

(c) a pair of pivotally inter-connected cross members pivotally mounted at the lower ends thereof to respective said lower portions of said side frames; and (d) a pair of second link members each pivotally mounted at one end thereof to an upper respective said side frame member and pivotally connected at the other end thereof to a respective cross frame member intermediate said pivotal inter-connection thereof and a free upper end of said cross frame member.

2. A laterally folding and tiltable wheelchair as claimed in claim 1 including cable means attached to said upper ends of said cross frame members to facilitate folding of said wheelchair.

3. A laterally folding and tiltable wheelchair as claimed in claim 1 including resilient means between said side frame members and said upper ends of said cross members.

4. A laterally folding and tilting wheelchair is claimed in claim 3 wherein said second link members include sufficient clearance at said other end thereof so as to ensure that said second link members snap into an over-center position when said chair is erected.

5. A laterally folding and tiltable wheelchair as claimed in claim 1 including backrest members substantially perpendicular to said side seat frame members and foldable strut means disposed between said backrest members so as to prevent accidental collapse of said wheelchair from its open position.

* * * * *